United States Patent
Zhang et al.

(10) Patent No.: US 11,558,628 B2
(45) Date of Patent: Jan. 17, 2023

(54) CACHING AND CLEARING MECHANISM FOR DEEP CONVOLUTIONAL NEURAL NETWORKS

(71) Applicant: Nokia Technologies Oy, Espoo (FI)

(72) Inventors: Honglei Zhang, Tampere (FI); Francesco Cricri, Tampere (FI); Hamed Rezazadegan Tavakoli, Espoo (FI); Jani Lainema, Tampere (FI); Emre Aksu, Tampere (FI); Nannan Zou, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/549,039

(22) Filed: Dec. 13, 2021

(65) Prior Publication Data

US 2022/0191524 A1  Jun. 16, 2022

Related U.S. Application Data

(60) Provisional application No. 63/125,054, filed on Dec. 14, 2020.

(51) Int. Cl.
*H04N 19/423* (2014.01)
*H04N 19/107* (2014.01)
(Continued)

(52) U.S. Cl.
CPC ......... *H04N 19/423* (2014.11); *H04N 19/107* (2014.11); *H04N 19/119* (2014.11); *H04N 19/176* (2014.11)

(58) Field of Classification Search
CPC .............. H04N 19/423; H04N 19/107; H04N 19/119; H04N 19/176
See application file for complete search history.

(56) References Cited

U.S. PATENT DOCUMENTS

| | | | |
|---|---|---|---|
| 2015/0193903 A1 | 7/2015 | Agarwal et al. | 1/20 |
| 2017/0053375 A1 | 2/2017 | Bolz | 1/20 |

(Continued)

OTHER PUBLICATIONS

Krizhevsky, Alex, Ilya Sutskever, and Geoffrey E Hinton. 2012. "ImageNet Classification with Deep Convolutional Neural Networks." *In Advances in Neural Information Processing Systems 25*, edited by F. Pereira, C. J. C. Burges, L. Bottou, and K. Q. Weinberger, 1097-1105. Curran Associates, Inc. http://papers.nips.cc/paper/4824-imagenet-classification-with-deep-convolutional-neural-networks.pdf.[retrieved Dec. 13, 2021].

(Continued)

*Primary Examiner* — Nam D Pham
(74) *Attorney, Agent, or Firm* — Joseph C. Drish; Harrington & Smith

(57) ABSTRACT

An apparatus includes circuitry configured to: partition an input tensor into one or more block tensors; partition at least one of the block tensors into one or more continuation bands, the one or more continuation bands being associated with a caching counter having a value; store the one or more continuation bands in a cache managed using a cache manager; retrieve, prior to a convolution or pooling operation on a current block tensor, the one or more continuation bands of a previous block tensor from the cache that are adjacent to a current block tensor; concatenate the retrieved continuation bands with the current block tensor; apply the convolution or pooling operation on the current block tensor after the concatenation; decrease the respective caching counter value of the retrieved continuation bands; and clear the continuation bands from the cache when its respective caching counter reaches a value of zero.

20 Claims, 10 Drawing Sheets

(51) Int. Cl.
H04N 19/176 (2014.01)
H04N 19/119 (2014.01)

(56) References Cited

U.S. PATENT DOCUMENTS

| | | |
|---|---|---|
| 2019/0220742 A1 | 7/2019 | Kuo ........................................ 3/8 |
| 2020/0202484 A1 | 6/2020 | Brigg et al. ........................ 1/60 |
| 2020/0272892 A1* | 8/2020 | Desappan .............. G06N 3/063 |

OTHER PUBLICATIONS

Long, Jonathan, Evan Shelhamer, and Trevor Darrell. 2015. "Fully Convolutional Networks for Semantic Segmentation." In *Proceedings of the IEEE Conference on Computer Vision and Pattern Recognition*, 3431-3440. http://www.cv-foundation.org/openaccess/content_cvpr_2015/html/Long_Fully_Convolutional_Networks_2015_CVPR_paper.html. [retrieved Dec. 13, 2021].

Zou, Nannan, Honglei Zhang, Francesco Cricri, Hamed R. Tavakoli, Jani Lainema, Miska Hannuksela, Emre Aksu, and Esa Rahtu. 2020. "L$^2$C—Learning to Learn to Compress." *ArXiv:2007.16054 [Cs, Eess, Stat]*, July. http://arxiv.org/abs/2007.16054. (May 1, 2021.

* cited by examiner

CACHING AND CLEARING MECHANISM FOR DEEP CONVOLUTIONAL NEURAL NETWORKS

RELATED APPLICATION

This application claims priority to U.S. Provisional Application No. 63/125,054, filed Dec. 14, 2020, which is hereby incorporated by reference in its entirety.

STATEMENT OF GOVERNMENT INTEREST

The project leading to this application has received funding from the ECSEL Joint Undertaking (JU) under grant agreement No 783162. The JU receives support from the European Union's Horizon 2020 research and innovation programme and Netherlands, Czech Republic, Finland, Spain, Italy.

TECHNICAL FIELD

The examples and non-limiting embodiments relate generally to multimedia transport and neural networks and, more particularly, to a caching and clearing mechanism for deep convolutional neural networks.

BACKGROUND

It is known to compress data to consume less space and to facilitate transmission.

SUMMARY

In one aspect, an apparatus includes at least one processor; and at least one memory including computer program code; wherein the at least one memory and the computer program code are configured to, with the at least one processor, cause the apparatus at least to perform: partition an input tensor into one or more block tensors; partition at least one of the block tensors into one or more continuation bands, the one or more continuation bands being associated with a caching counter having a value; store the one or more continuation bands in a cache managed using a cache manager; retrieve, prior to a convolution or pooling operation on a current block tensor, the one or more continuation bands of a previous block tensor from the cache that are adjacent to a current block tensor; concatenate the retrieved continuation bands with the current block tensor; apply the convolution or pooling operation on the current block tensor after the concatenation; decrease the respective caching counter value of the retrieved one or more continuation bands; and clear the one or more continuation bands from the cache when its respective caching counter reaches a value of zero.

In one aspect, a method includes partitioning an input tensor into one or more block tensors; partitioning at least one of the block tensors into one or more continuation bands, the one or more continuation bands being associated with a caching counter having a value; storing the one or more continuation bands in a cache managed using a cache manager; retrieving, prior to a convolution or pooling operation on a current block tensor, the one or more continuation bands of a previous block tensor from the cache that are adjacent to a current block tensor; concatenating the retrieved continuation bands with the current block tensor; applying the convolution or pooling operation on the current block tensor after the concatenation; decreasing the respective caching counter value of the retrieved one or more continuation bands; and clearing the one or more continuation bands from the cache when its respective caching counter reaches a value of zero.

In one aspect, a non-transitory program storage device readable by a machine, tangibly embodying a program of instructions executable by the machine for performing operations is provided, the operations comprising: partitioning an input tensor into one or more block tensors; partitioning at least one of the block tensors into one or more continuation bands, the one or more continuation bands being associated with a caching counter having a value; storing the one or more continuation bands in a cache managed using a cache manager; retrieving, prior to a convolution or pooling operation on a current block tensor, the one or more continuation bands of a previous block tensor from the cache that are adjacent to a current block tensor; concatenating the retrieved continuation bands with the current block tensor; applying the convolution or pooling operation on the current block tensor after the concatenation; decreasing the respective caching counter value of the retrieved one or more continuation bands; and clearing the one or more continuation bands from the cache when its respective caching counter reaches a value of zero.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
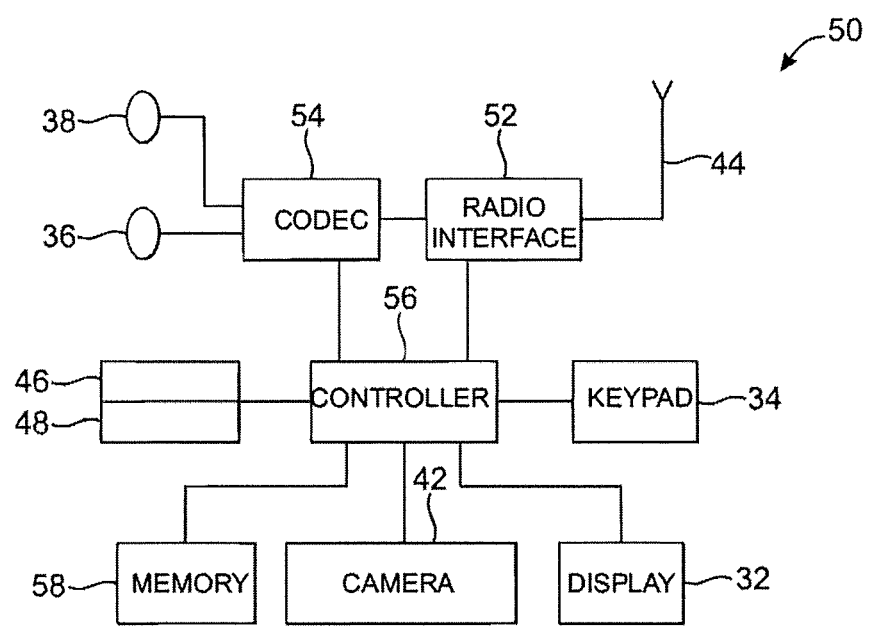
FIG. 1 shows schematically an electronic device employing embodiments of the examples described herein.
Figure 2:
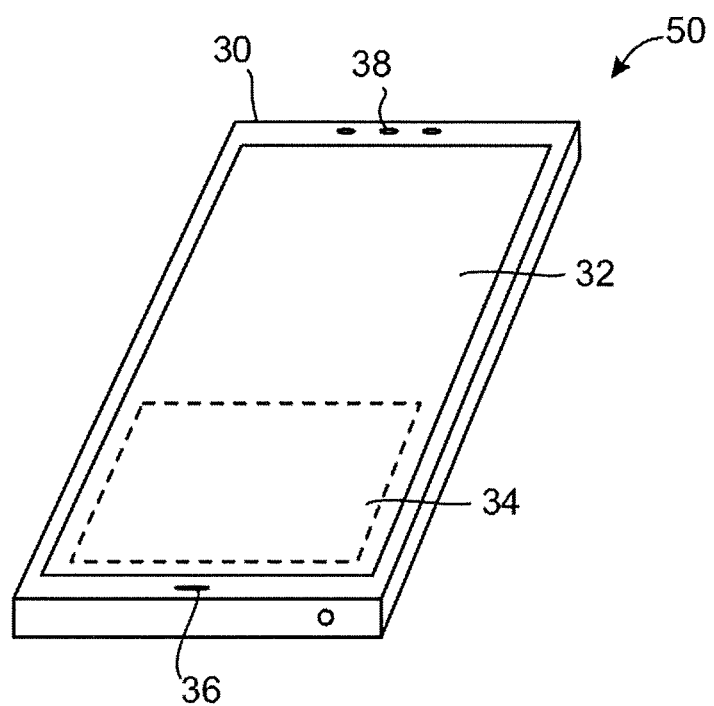
FIG. 2 shows schematically a user equipment suitable for employing embodiments of the examples described herein.

The following describes in detail a suitable apparatus and possible mechanisms for a video/image encoding process according to embodiments. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 are explained next.

The electronic device 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analog signal input. The apparatus 50 may further comprise an audio output device which in embodiments of the examples described herein may be any one of: an earpiece 38, speaker, or an analog audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
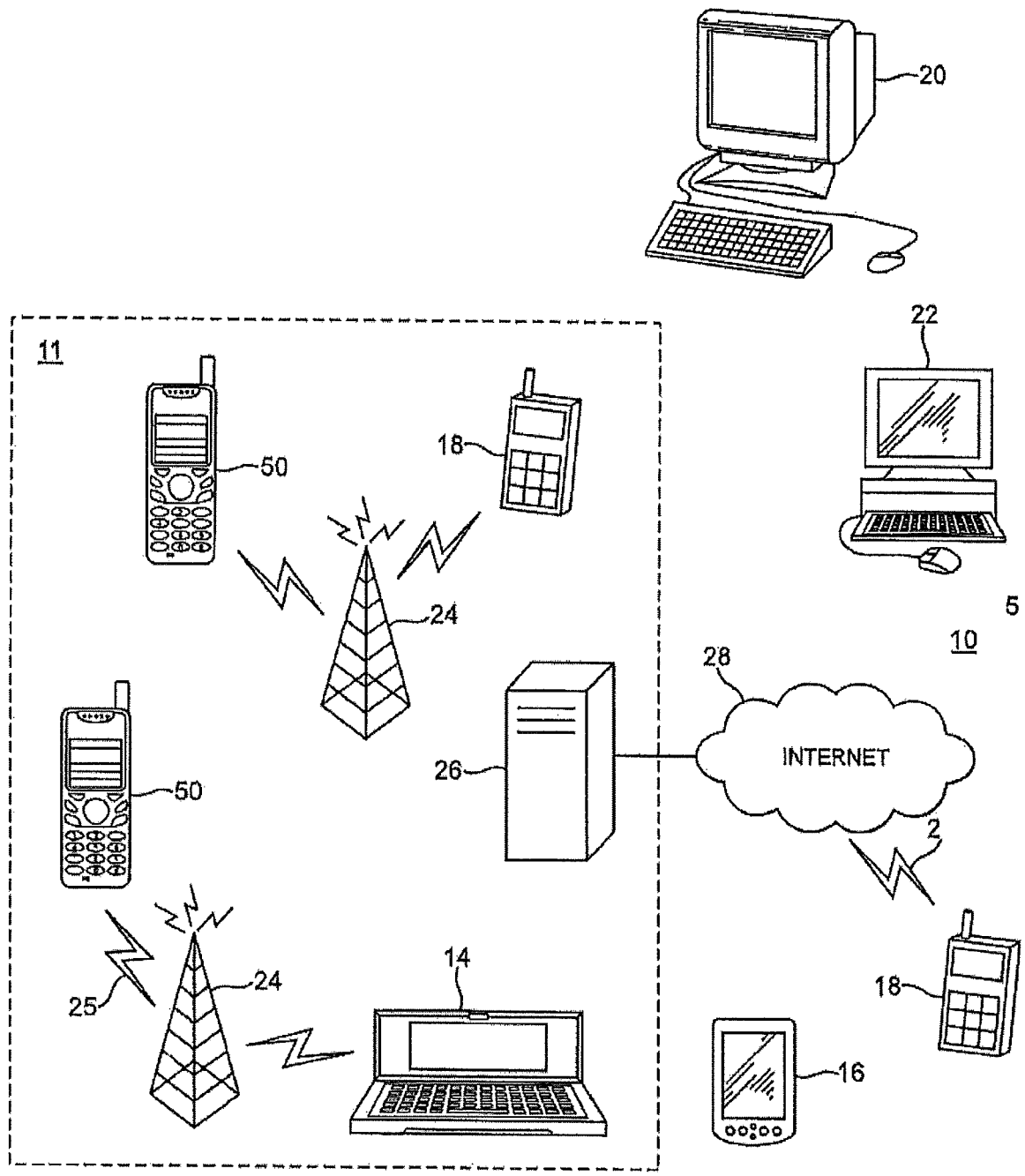
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport. A head mounted display (HMD) may also be configured to implement the methods as described herein, such as a caching and clearing mechanism for deep convolutional neural networks.

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, etc. to be included in the Internet of Things (IoT). In order to utilize the Internet IoT devices are provided with an IP address as a unique identifier. IoT devices may be provided with a radio transmitter, such as a WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

A video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically the encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction, while in other cases inter prediction may refer collectively to temporal prediction and any of intra block copy, inter-layer prediction, and inter-view prediction provided that they are performed with the same or similar process as temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in the spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and the difference relative to the motion vector predictor may be coded. Prediction of coding parameters and intra prediction may be collectively referred to as in-picture prediction.

Figure 4:
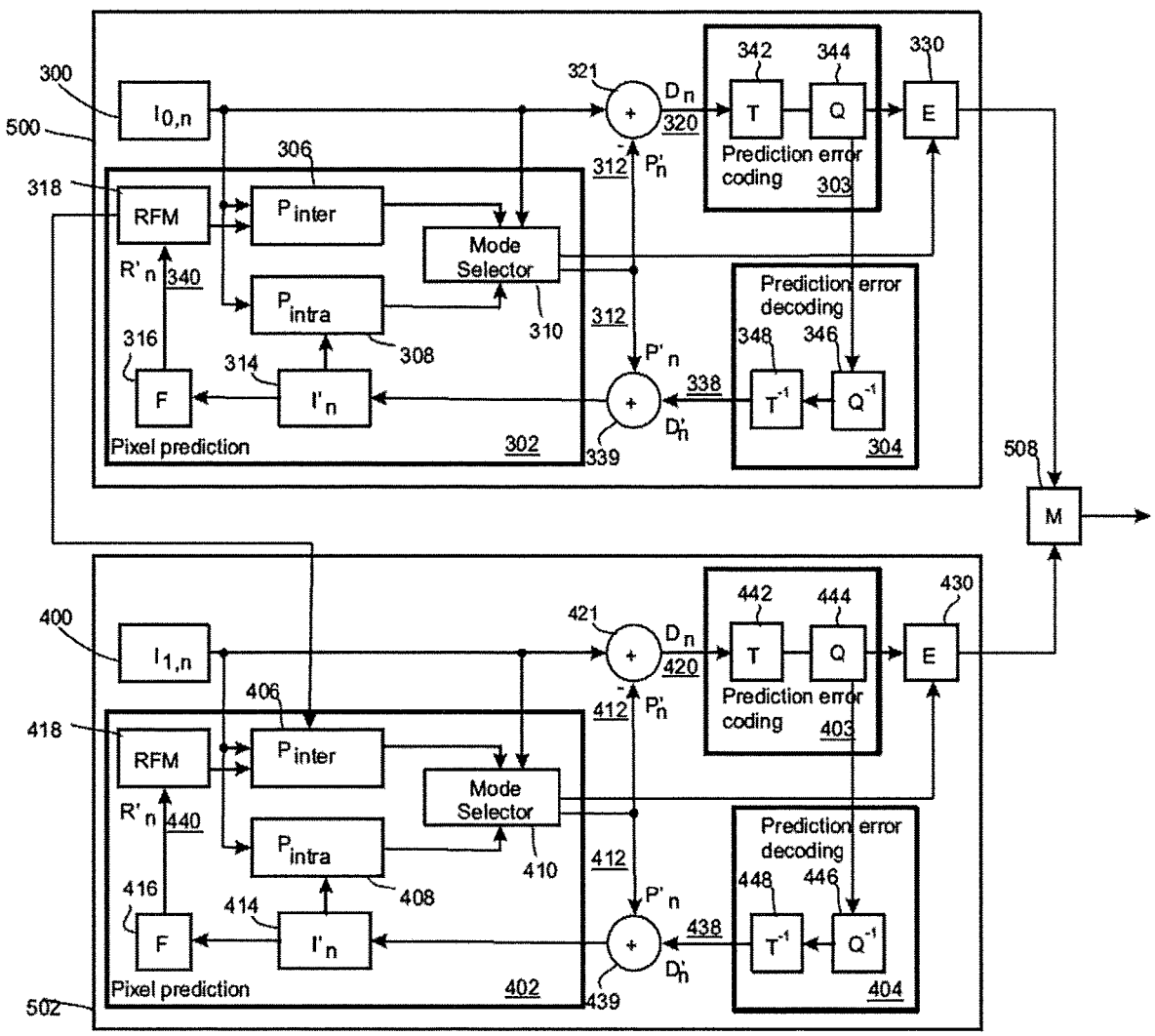
FIG. 4 shows schematically a block diagram of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406 ($P_{inter}$), an intra-predictor 308, 408 ($P_{intra}$) a mode selector 310, 410, a filter 316, 416 (F), and a reference frame memory 318, 418 (RFM). The pixel predictor 302 of the first encoder section 500 receives 300 base layer images ($I_{0,n}$) of a video stream to be encoded at both the inter-predictor 306 (which determines the difference between the image and a motion compensated reference frame 318) and the intra-predictor 308 (which determines a prediction for an image block based on the already processed parts of the current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images ($I_{1,n}$) of a video stream to be encoded at both the inter-predictor 406 (which determines the difference between the image and a motion compensated reference frame 418) and the intra-predictor 408 (which determines a prediction for an image block based on the already processed parts of the current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 ($D_n$) which is input to the prediction error encoder 303, 403.

The pixel predictor 302, 402 further receives from a preliminary reconstructor 339, 439 the combination of the prediction representation of the image block 312, 412 ($P'_n$) and the output 338, 438 ($D'_n$) of the prediction error decoder 304, 404. The preliminary reconstructed image 314, 414 ($I'_n$) may be passed to the intra-predictor 308, 408 and to the filter 316, 416. The filter 316, 416 receiving the preliminary representation may filter the preliminary representation and output a final reconstructed image 340, 440 ($R'_n$) which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be the source for inter-layer sample prediction and/or inter-layer motion information prediction of the enhancement layer according to some embodiments, the reference frame memory 318 may also be connected to the inter-predictor 406 to be used as the reference image against which a future enhancement layer picture 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be the source for predicting the filtering parameters of the enhancement layer according to some embodiments.

The prediction error encoder 303, 403 comprises a transform unit 342, 442 (T) and a quantizer 344, 444 (Q). The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder 304, 404 may be considered to comprise a dequantizer 346, 446 ($Q^{-1}$), which dequantizes the quantized coefficient values, e.g. DCT coefficients, to reconstruct the transform signal and an inverse transformation unit 348, 448 ($T^{-1}$), which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 (E) receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508 (M).

Fundamentals of Neural Networks

A neural network (NN) is a computation graph consisting of several layers of computation. Each layer consists of one or more units, where each unit performs an elementary computation. A unit is connected to one or more other units, and the connection may be associated with a weight. The weight may be used for scaling the signal passing through the associated connection. Weights are learnable parameters, i.e., values which can be learned from training data. There may be other learnable parameters, such as those of batch-normalization layers.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more of preceding layers, and provide output to one or more of following layers.

Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of devices, such as mobile phones. Examples include image and video analysis and processing, social media data analysis, device usage data analysis, etc.

The most important property of neural nets (and other machine learning tools) is that they are able to learn properties from input data, either in a supervised way or in an unsupervised way. Such learning is a result of a training algorithm, or of a meta-level neural network providing the training signal. In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, i.e., to gradually decrease the loss.

Training a neural network is an optimization process, but the final goal is different from the typical goal of optimization. In optimization, the goal is to minimize a function. In machine learning, the goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data is usually split into at least two sets, the training set and the validation set. The training set is used for training the network, i.e., to modify its learnable parameters in order to minimize the loss. The validation set is used for checking the performance of the network on data which was not used to minimize the loss, as an indication of the final performance of the model. In particular, the errors on the training set and on the validation set are monitored during the training process to understand the following things: i) if the network is learning at all—in this case, the training set error should decrease, otherwise the model is in the regime of underfitting; and ii) if the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well on that set, but performs poorly on a set not used for tuning its parameters.

Lately, neural networks have been used for compressing and de-compressing data such as images. The most widely used architecture for such task is the auto-encoder, which is a neural network consisting of two parts: a neural encoder and a neural decoder (we refer to these simply as encoder and decoder in this description, even though algorithms which are learned from data are referred to instead of being tuned by hand). The encoder takes as input an image and produces a code which requires less bits than the input image. This code may have obtained by a binarization or quantization process after the encoder. The decoder takes in this code and reconstructs the image which was input to the encoder. Such encoder and decoder are usually trained to minimize a combination of bitrate and distortion, where the distortion is usually Mean Squared Error (MSE), PSNR, SSIM, or similar metrics. These distortion metrics are meant to be inversely proportional to the human visual perception quality.

Fundamentals of Convolution and Pooling Operations

Convolution is a basic building block for convolutional neural networks, which has achieved great success in computer vision and natural language processing tasks. Convolution operation uses a linear kernel, defined by the kernel size and the weights, and operates on an input tensor. The operation is associated with a stride value which defines the step-size of the kernel when it is moving across the input tensor. Note that when the stride value is less than the kernel size, the convolution kernel is applied on overlapping input areas. A convolution operation with a kernel size larger than one generates the output tensor smaller than the input tensor in size. A padding operation, often consisting of padding with zeros, can be applied to the input tensor prior to the application of the convolutional operator, in order to increase the size of the output tensor.

When the stride value is 2, the convolution operation performs a down-sampling operation, i.e., the output of the convolution operation has half of the size of the input of the convolution operation, on the dimension for which the stride value is 2. If the input is a two-dimensional tensor, i.e., a matrix, and the stride value for both dimensions is 2, then the output tensor is half of the size of the input tensor for both dimensions.

Different convolution operations have been introduced for various purposes. For example, transposed convolution with stride value 2 can be used as an upscale operation which is opposite to the downscale operation that a normal convolution with stride value 2 does. Dilated convolution can be used to increase the receptive field—the region of the input from which an output value is calculated.

After a convolution operation, a nonlinear function is usually applied, such as a rectified linear unit (ReLU), softmax, sigmoid. Also, other layers which may be used before the convolution, or after the convolution, or after the nonlinear function, are normalization layers such as batch-normalization layers.

Pooling is another operation that has often been used in convolutional neural networks. The pooling operation works in a similar manner as a convolution operation such that an operation on a small size of data is applied across the input tensor. Depending on the kernel size and the stride value, two consecutive pooling operations may be applied on an overlapping area.

Fundamentals of System Memory Management

Deep neural networks require massive computing resources. Thus, modern machine learning systems normally perform the computing on dedicated computing units such as a GPU/TPU because of their parallel computing capacities. Each computing unit uses its own memory for computation to speed up the calculation. For example, in a system with a CPU and a GPU/TPU, the CPU uses the main memory of the system and the GPU/TPU uses its own memory. The CPU is responsible for preparing the data and collecting the results. The data to be processed by GPU/TPU are transferred to the GPU/TPU memory and results are transferred back to the main memory.

Normally, the memory of the computing units is limited and the data exchange between the computing unit's memory and the main memory is expensive. Thus, a deep neural network system must load the data that is directly involved in computing to the computing unit's memory and try to minimize the data transfers between these memories.

Fundamentals of Neural Network-Based End-to-End Learned Video Coding

Figure 5:
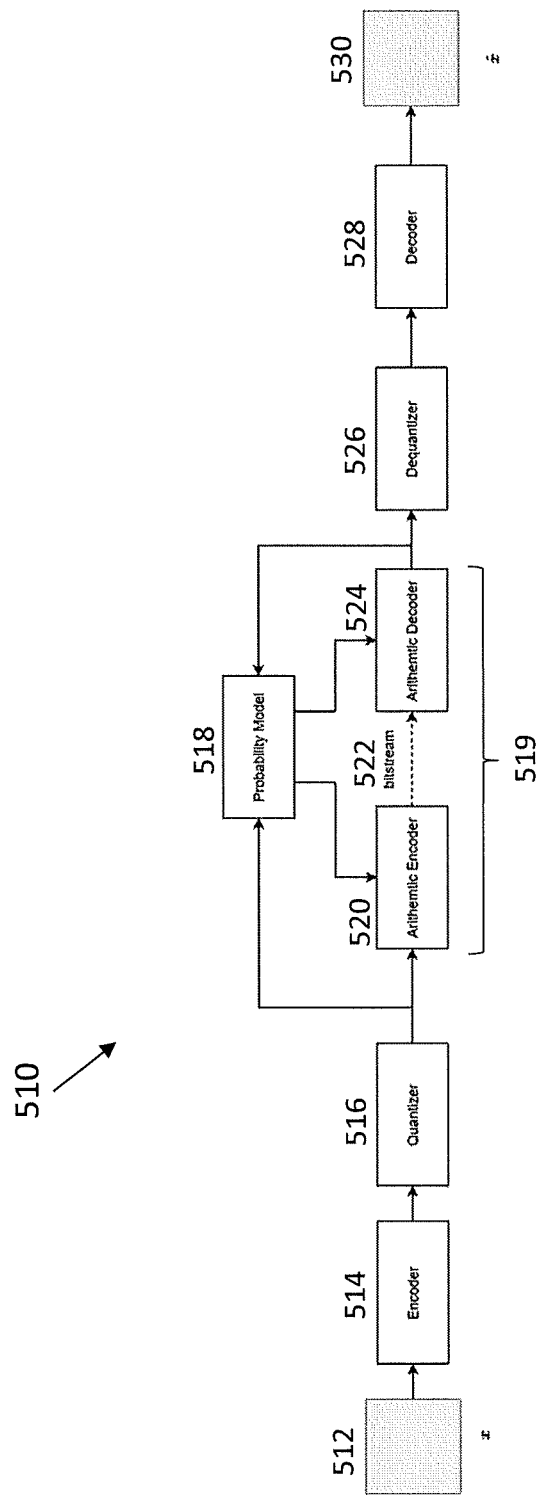
FIG. 5 is an example neural network-based end-to-end learned video coding system.

As shown in FIG. 5, an example neural network-based end-to-end learned video coding system 510 contains encoder 514, quantizer 516, probability model 518, entropy codec 519 (for example arithmetic encoder 520/arithmetic decoder 524), dequantizer 526, and decoder 528. The encoder 514 and decoder 528 are typically two neural networks, or mainly comprise neural network components. The probability model 518 may also comprise mainly neural network components. Quantizer 516, dequantizer 526 and entropy codec 519 are typically not based on neural network components, but they may also comprise neural network components, potentially.

On the encoder side, the encoder 514 component takes a video as input 512 and converts the video from its original signal space into a latent representation that may comprise a more compressible representation of the input 512. In the case of an input image, the latent representation may be a 3-dimensional tensor, where two dimensions represent the vertical and horizontal spatial dimensions, and the third dimension represents the "channels" which contain information at that specific location. If the input image 512 is a 128×128×3 RGB image (with horizontal size of 128 pixels, vertical size of 128 pixels, and 3 channels for the Red, Green, Blue color components), and if the encoder 514 downsamples the input tensor by 2 and expands the channel dimension to 32 channels, then the latent representation is a tensor of dimensions (or "shape") 64×64×32 (i.e., with horizontal size of 64 elements, vertical size of 64 elements, and 32 channels). The order of the different dimensions may differ depending on the convention which is used; in some cases, for the input image 512, the channel dimension may be the first dimension, so for the above example, the shape of the input tensor may be represented as 3×128×128, instead of 128×128×3. In the case of an input video as input 512 (instead of just an input image as input 512), another dimension in the input tensor may be used to represent temporal information. The quantizer component 516 quantizes the latent representation into discrete values given a predefined set of quantization levels. Probability model 518 and arithmetic codec component 519 work together to perform lossless compression for the quantized latent representation and generate bitstreams (such as bitstream 522) to be sent to the decoder side. Given a symbol to be encoded into the bitstream 522, the probability model 518 estimates the probability distribution of all possible values for that symbol based on a context that is constructed from available information at the current encoding/decoding state, such as the data that has already been encoded/decoded. Then, the arithmetic encoder 520 encodes the input symbols to the bitstream 522 using the estimated probability distributions.

On the decoder side, opposite operations are performed. The arithmetic decoder 524 and the probability model 518 first decode symbols from the bitstream 522 to recover the quantized latent representation. Then the dequantizer 526 reconstructs the latent representation in continuous values and passes it to decoder 528 to recover the input video/image 512 as recovered output 530 e.g. a recovered video/image. Note that the probability model 518 in this system 510 is shared between the encoding and decoding systems. In practice, this means that a copy of the probability model 518 is used at the encoder side, and another copy is used at the decoder side.

In this system 510, the encoder 514, probability model 518, and decoder 528 are normally based on deep neural networks. The system 510 is trained in an end-to-end manner by minimizing the following rate-distortion loss function:

$$L = D + \lambda R,$$

where D is the distortion loss term, R is the rate loss term, and λ is the weight that controls the balance between the two losses. The distortion loss term may be the mean square error (MSE), structure similarity (SSIM) or other metrics that evaluate the quality of the reconstructed video (or reconstructed input 530 generally). Multiple distortion losses may be used and integrated into D, such as a weighted sum of MSE and SSIM. The rate loss term is normally the estimated entropy of the quantized latent representation, which indicates the number of bits necessary to represent the encoded symbols, for example, bits-per-pixel (bpp).

For lossless video/image compression, the system 510 contains the probability model 518 and arithmetic encoder 520/arithmetic decoder 524. The system loss function contains the rate loss, since the distortion loss is zero (i.e., no loss of information).

For many machine learning tasks, for example, object detection/segmentation and video coding, a deep neural network system is trained using a large training dataset with the target to minimize a predefined loss function. The model obtained from the training is used at the inference stage for the specific task. When the system is working at the inference stage, the input data, images or video, may have a different size from the data used for training. One solution to that problem is to rescale the input data to the size for which the deep neural network was designed [refer to Krizhevsky, Alex, Ilya Sutskever, and Geoffrey E Hinton. 2012. "ImageNet Classification with Deep Convolutional Neural Networks." In *Advances in Neural Information Processing Systems* 25, edited by F. Pereira, C. J. C. Burges, L. Bottou, and K. Q. Weinberger, 1097-1105. Curran Associates, Inc. http://papers.nips.cc/paper/4824-imagenet-classification-with-deep-convolutional-neural-networks.pdf (http link last accessed Nov. 19, 2020)]. This solution may suffer from the loss of performance due to the rescaling operation. More importantly, this solution cannot be applied to applications where the input data is not allowed to be modified, for example, video coding. For these tasks, the fully convolutional neural network architecture is often used [refer to Long, Jonathan, Evan Shelhamer, and Trevor Darrell. 2015. "Fully Convolutional Networks for Semantic Segmentation." In *Proceedings of the IEEE Conference on Computer Vision and Pattern Recognition*, 3431-3440. https://www.cv-foundation.org/openaccess/content_cvpr_2015/html/Long_Fully_Convolutional_Networks_2015_CVPR_paper.html (http link last accessed Nov. 19, 2020)] (i.e., a neural network architecture in which there are no layers which require a predefined spatial size for the input data), where the system can take the input data of arbitrary size. The system may be trained using the input data of the same size in each batch to speed up the training. At the inference stage, the input data can be fed into the system without scaling.

Because of the memory limitation in the computing unit, such as the GPU, the neural network is often trained to work on patches of a smaller size than the data encountered at the inference stage. For example, a video coding system trained using patches with a size of 256×256 can be used to encode and decode high-resolution videos, for example, 4K or 8K videos. In this case, the GPU memory may not be enough to process the whole input data at the inference stage. There are also situations where the training must be performed on input data with a large size that cannot be fitted to the GPU memory. In the rest of this description, video coding is used as an example application. However, the described method can be applied to other applications that suffer from this problem.

Figure 6:
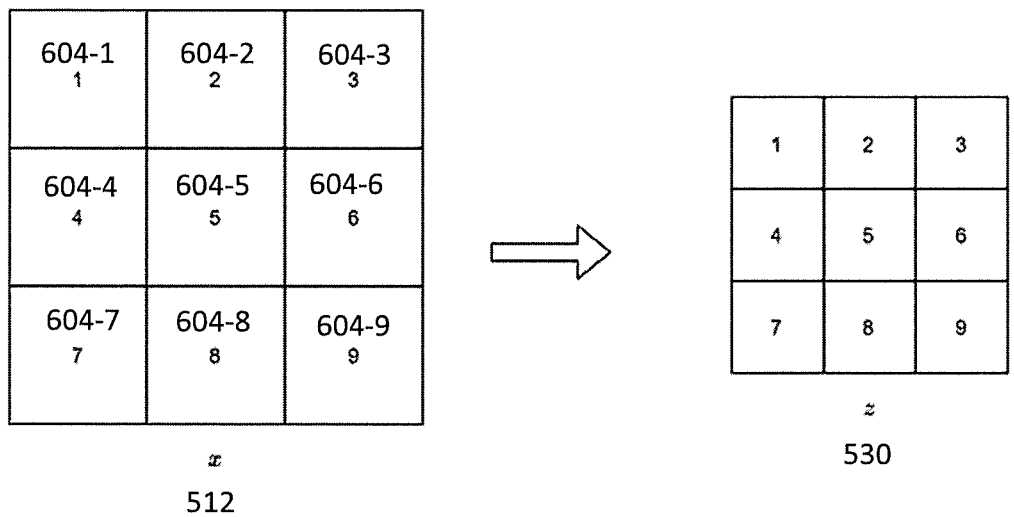
FIG. 6 shows an input tensor x partitioned into 9 non-overlapping blocks, where each block is processed individually by an encoder neural network, and where the results of each block are concatenated together to generate a final output z.

To solve the problem of limited GPU memory, one can partition the input into non-overlapping blocks, and merge the outputs of the blocks to generate the final output. This method is illustrated in FIG. 6. As shown in FIG. 6, input tensor x (item 512) is partitioned into 9 non-overlapping blocks 604 and each block 604 is processed individually by the encoder neural network 514. The results of each block 604 are concatenated together to generate the final output z (item 530). Blocks 1 through 9 correspond respectively to reference numbers 604-1, 604-2, 604-3, 604-4, 604-5, 604-6, 604-7, 604-8, and 604-9.

However, the merged results 530 typically show blocking artifacts because of the border effects. For a video coding task, the system 510 has two parts, the encoder part and the decoder part. The partition and the merging need to be treated separately, since the encoder 514 and decoder 528 work on different systems, and the partition and merging parameters are different for the encoder 514 and decoder 528.

Figure 7:
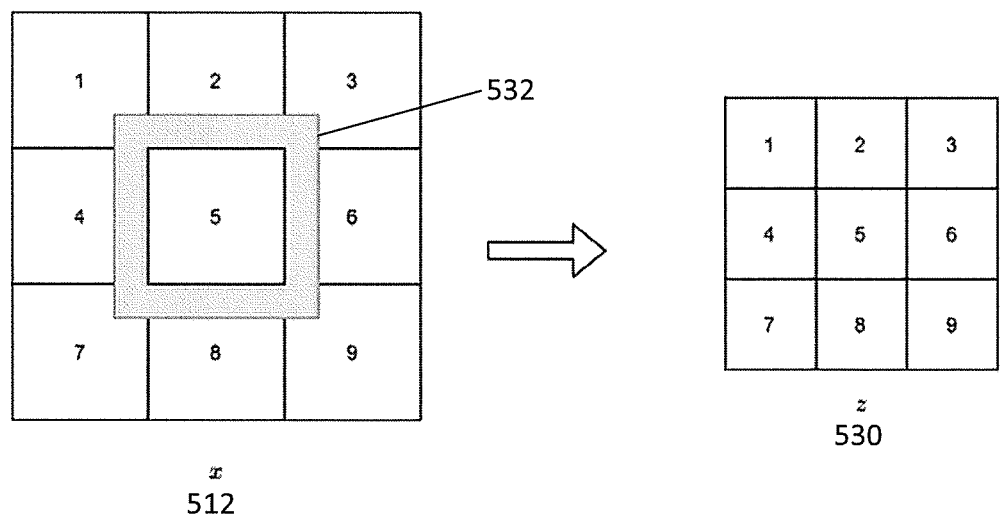
FIG. 7 demonstrates an input tensor x being partitioned into blocks with overlapping areas (shaded area), and the outputs of each block being merged to generate a final output tensor z.

When no overlapping is used, each block that is given as input to the encoder neural network 514 needs to be padded (e.g., zero-padded) at the borders. This results in blocking artifacts in the image output by the decoder neural network 528, because the border content affected by the padding operation. A solution to this problem is to partition the input tensor into blocks with overlapping. Since a deep convolution neural network contains many layers of convolution and pooling operations, the overlapping area should be larger than the receptive field of the network to avoid data loss [refer to Zou, Nannan, Honglei Zhang, Francesco Cricri, Hamed R. Tavakoli, Jani Lainema, Miska Hannuksela, Emre Aksu, and Esa Rahtu. 2020. "$L^2C$—Learning to Learn to Compress." ArXiv:2007.16054 [Cs, Eess, Stat], July. http://arxiv.org/abs/2007.16054 (http link last accessed Nov. 19, 2020), herein "$L^2C$"]. This method is illustrated in FIG. 7. In FIG. 7, the input tensor x 512 is partitioned into blocks with overlapping areas, as shown by the shaded area 532. The outputs of each block are merged to generate the final output tensor z 530.

However, this method has the following disadvantages, such as i) it is not computational efficient because of the duplicate computation on the overlapped area 532, and ii) unnecessary data transmission is performed between the main memory and GPU memory because of the overlapped area 532.

Figure 8:
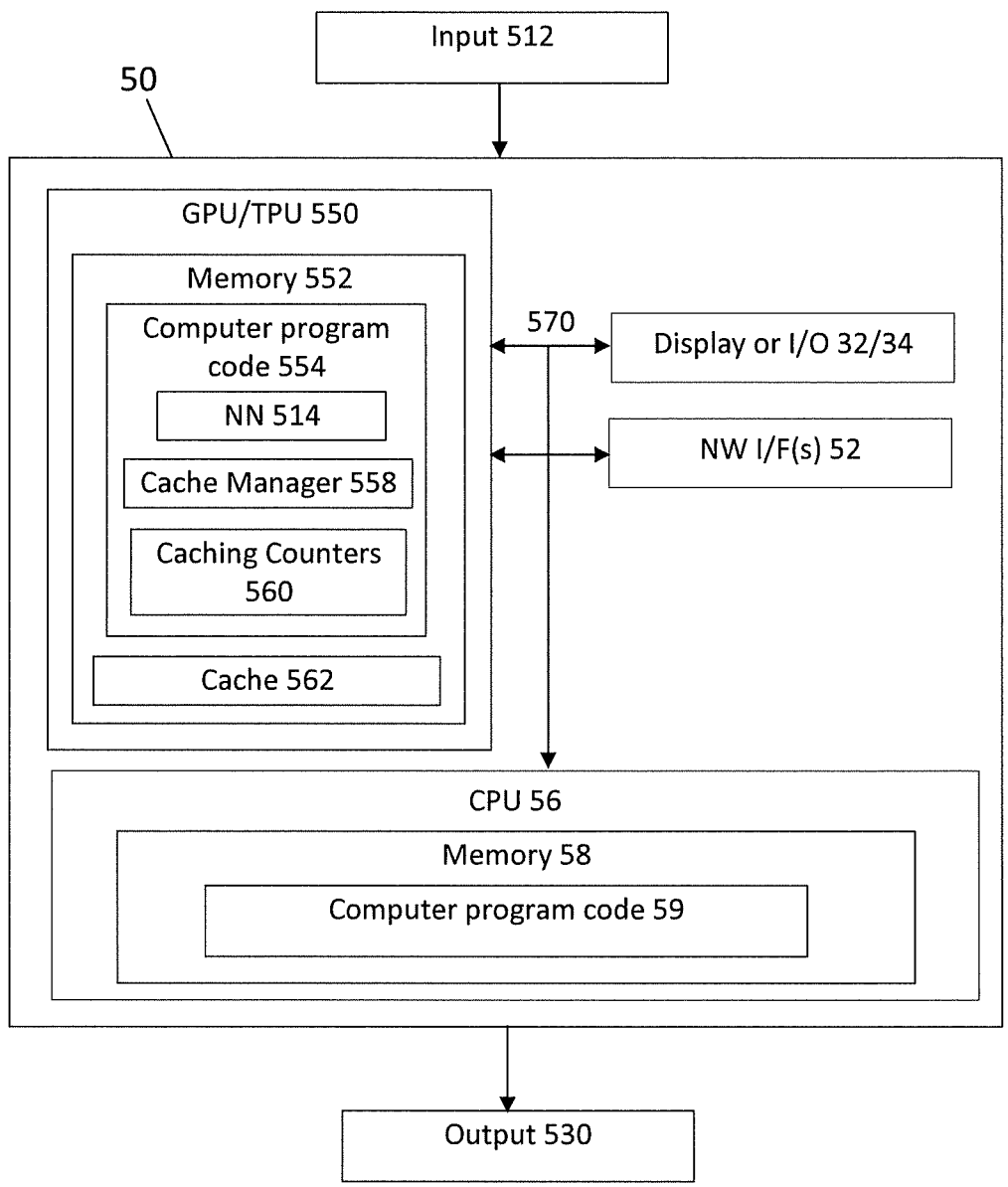
FIG. 8 is an example apparatus, which may be implemented in hardware, configured to implement a caching and clearing mechanism for deep convolutional neural networks, based on the examples described herein.

To address the above issues, and with reference to the figures including FIG. 1 and FIG. 8, described herein is a caching mechanism that can be applied to convolution and pooling operations. The described method improves the computational efficiency and minimizes the data exchange between the CPU and GPU memories (respectively memory 58 and memory 552) when the input data 512 is too large to be processed by a GPU 550.

The examples described herein address the problems caused by the overlapping tiling method [$L^2C$] when the input data 512 is too large to be processed by a GPU 550. The solution is a caching and clearing mechanism that can avoid unnecessary data exchange between the CPU memory 58 and the GPU memory 552. The mechanism avoids duplicate calculation of the overlapped area when a multilayer deep neural network 514 is used. The system 510 using the method described herein can concatenate the results of each block 604 to generate the exact same final result (or at least a similar final result) as when the input data 512 is processed as a whole.

The encoder of an end-to-end video coding system (such as encoder 514 of system 510 shown in FIG. 5) is an example that illustrates the method described herein. The approach can be applied to other deep convolutional neural network systems in the same way.

With the described method, the input tensor 512 is first partitioned into non-overlapping blocks 604 (refer e.g. to FIG. 6). The size of the block 604 may be determined by the memory in the computing device 50, for example, by the GPU memory 552. These blocks 604 are processed one-by-one in a raster scan order.

Figure 10:
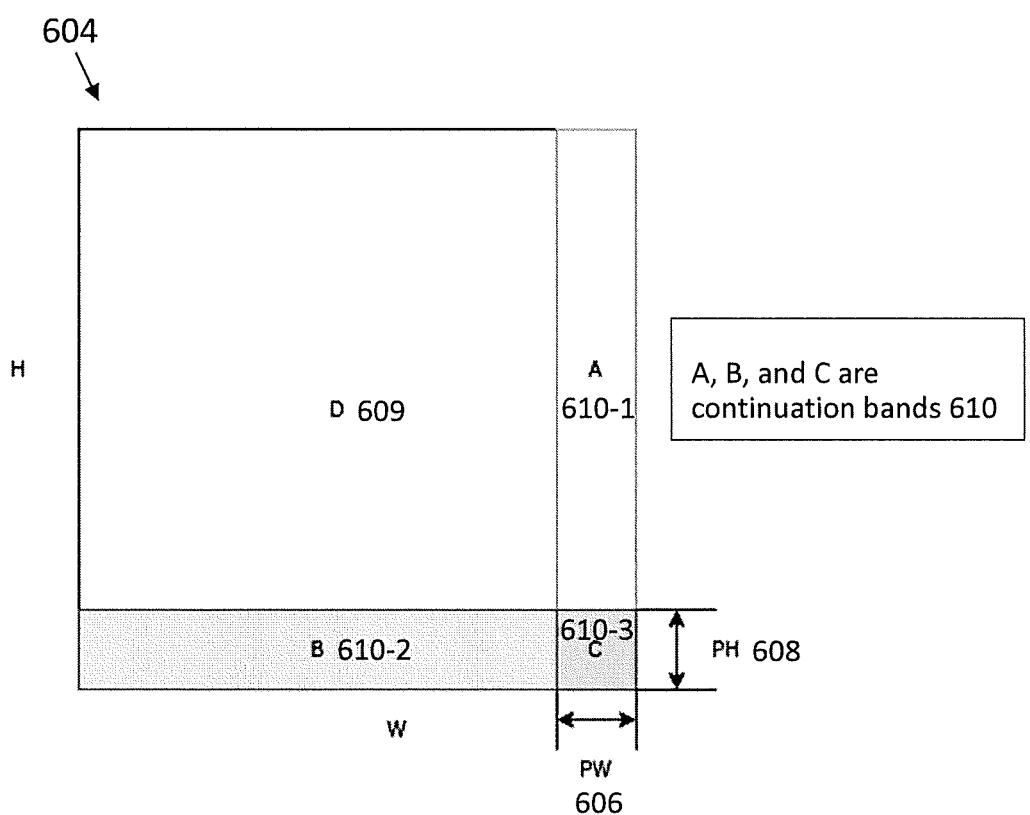
FIG. 10 shows different regions on a block tensor, where regions A, B and C are continuation bands.

For each convolution or pooling operation, the input block tensor 512 is first partitioned into several areas, called continuation bands (continuation bands 610 are shown in FIG. 10, including continuation band A 610-1, continuation band B 610-2, and continuation band C 610-3). Each continuation band 610 is associated with a caching counter 560. The initial counter values 560 are determined by the type of the continuation band 610 and the position of the block 604 in the input tensor 512. The continuation bands 610 are then stored in a cache 562 that is managed by a cache manager 558. The system 510/50 retrieves the continuation bands 610 from the cache 562 that should be combined with the current block tensor (one of blocks 604). These continuation bands 610 are concatenated with the current block tensor 604 and the operation is applied. After the operation, the caching counter 560 of the used continuation band 610 is decreased by one. A cached continuation band 610 is cleared from the memory 552 by the caching manager 558 when the (e.g. its) caching counter 560 reaches zero.

Accordingly, the example embodiment of the apparatus shown in FIG. 8 is configured to implement (and has circuitry configured to implement) a caching and clearing mechanism for deep convolutional neural networks (e.g. 514), based on the examples described herein (apparatus 50 is also shown in FIG. 1). As shown in FIG. 8, the apparatus 50 comprises at least one processor (as shown GPU/TPU 550 and CPU 56), at least one non-transitory memory 552/58 including computer program code 554/59, wherein the at least one memory 552/58 and the computer program code 554/59 are configured to, with the at least one processor 550/56, cause the apparatus to implement a caching and clearing mechanism for deep convolutional neural networks, based on the examples described herein.

In FIG. 8, the NN 514, cache manager 558, caching counters 560 and cache 562 are shown as being part of the GPU/TPU 550. In other examples based on the method described herein, one or more of the NN 514, cache manager 558, caching counters 560 and cache 562 are part of the CPU 56.

Also shown in FIG. 8 is display or I/O 32/34 that may be used to display output (such as output 530) during encoding or decoding and/or receive input (such as input 512). Also shown in FIG. 8 is one or more network (NW) interfaces (I/F(s)) 52. The NW I/F(s) 52 may be wired and/or wireless and communicate over the Internet/other network(s) via any communication technique. The NW I/F(s) 52 may comprise one or more transmitters and one or more receivers. The N/W I/F(s) 52 may comprise standard well-known components such as an amplifier, filter, frequency-converter, (de)modulator, and encoder/decoder circuitry(ies) and one or more antennas. Bus 570 connects the various components of apparatus 50, as shown, enabling data flow between the components. The apparatus 50 may correspond to any of the devices depicted in FIG. 1, FIG. 2, FIG. 3, and FIG. 4, including first encoder section 500 of FIG. 4, and second encoder section 502 of FIG. 4.

Continuation Bands of a Block Tensor

The described method applies to convolution and similar operations, such as pooling, where input data is processed with a linear kernel or a predefined operation, for example, a max or average operation. Next, a 2-dimensional (2D) convolution is used to demonstrate the method. The described method can be naturally extended to 1D, 3D or other dimension operations.

First, an input tensor x 512 is partitioned into multiple non-overlapping blocks 604. The blocks 604 are processed in a raster scan order as shown in FIG. 6. A convolution operation is performed on each block tensor. Note that the convolution can be in the first layer that is applied to the input data or in an intermediate layer of a deep neural network 514. In the latter case, the input to the convolution is the output tensor from the previous layer.

Figure 9A:
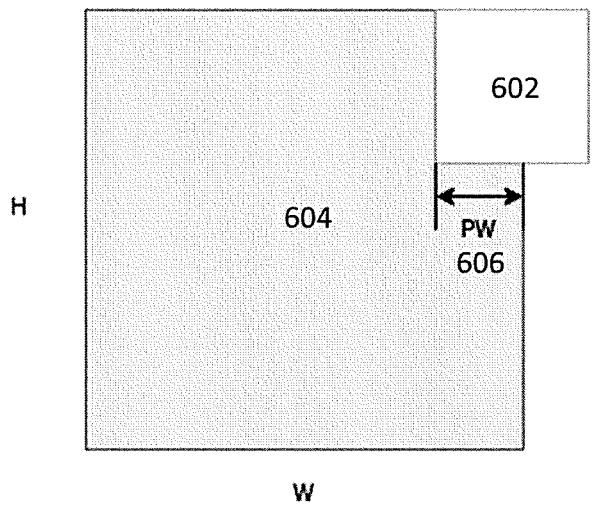
FIG. 9A shows a convolution kernel (smaller box) operating on a block tensor of size H×W, where the kernel is on the position that the next convolution would take place if the block tensor is infinitely large, and where PW is a positive number.
Figure 9B:
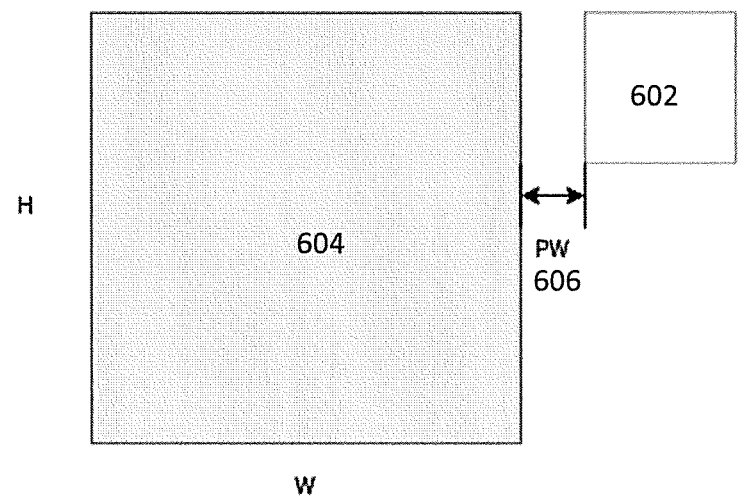
FIG. 9B shows a convolution kernel (smaller box) operating on a block tensor of size H×W, where the kernel is on the position that the next convolution would take place if the block tensor is infinitely large, and where PW is a negative number.

Each of FIG. 9A and FIG. 9B shows a convolution kernel of size k×k (smaller box 602) that operates on a block tensor of size H×W (larger box 604). The kernel box 602 moves across the block tensor 604, and stays inside of it 604, with a determined stride value s. For simplicity, it is assumed that the kernel size and stride value are the same for both width and height directions. Each of FIG. 9A and FIG. 9B shows a position that the next convolution would take place if the block tensor 604 was infinitely large. Distance PW 606 is defined as the continuation band size in width direction. It can be calculated that $$PW = W - \left(\text{floor}\left(\frac{W-k}{s}\right) * s + s\right),$$

where s is the stride value. In the same way, the continuation band size in the height direction can be calculated by $$PH = H - \left(\text{floor}\left(\frac{H-k}{s}\right) * s + s\right).$$

Note that PW 606 and PH 608 can be negative numbers in some situations, as shown in FIG. 9B.

Given the continuation band size defined above, a block tensor 604 is divided into regions called continuation bands 610. FIG. 10 shows the regions of a block tensor 604. Region A 610-1, B 610-2 and C 610-3 are continuation bands 610 and the sizes are determined by PW 606 and PH 608 (region D 609 is shown as not being a continuation band). If PW 606 and/or PH 608 have negative values, the continuation bands 610 have negative width 606 and/or height 608.

Caching and Clearing Mechanism

Continuation bands 610 are the areas of a block tensor 604 that should be concatenated to the next block tensor 604 to continue the convolution. Band A 610-1 and C 610-3 form a tensor that is required to continue the calculation if the convolution would be extended to the right direction (i.e., if the convolution is applied on the right-hand side block 604 with respect to the current block 604). Band B 610-2 and C 610-3 form a tensor that is required to continue the calculation if the convolution would be extended to the downward direction (i.e., if the convolution is applied on the bottom side block 604 with respect to the current block 604). And band C 610-3 is required if the convolution would be extended to the bottom right direction (i.e., if the convolution is applied on the bottom-right side block 604 with respect to the current block 604).

Next, a caching counter 560 is assigned to each continuous band 610 when they are stored in a cache 562 by the cache manager 558. The counter 560 determines when the associated continuous band 610 shall be cleared from the cache 562. Different initial values for the counters 560 are assigned to the continuous bands 610 depending on the position of the block 604 being processed. The initial values are assigned using the following rules: i) for blocks at the rightmost side, except the bottom right corner, of the input tensor 512, e.g. block 3 and 6 in FIG. 6: A=0, B=1, C=1; ii) for blocks at the bottommost side, except the bottom right corner, of the input tensor 512, e.g. block 7 and 8 in FIG. 6: A=1, B=0, C=1; iii) for the bottom right block of the input tensor 512, e.g. block 9 in FIG. 6: A=0, B=0, C=0; iv) for other blocks 604, e.g. block 1, 2, 4, and 5 in FIG. 6: A=1, B=1, C=3.

Before a convolution is performed on a block tensor 604, the system 510 (e.g. apparatus 50) first queries from the cache manager 558 if there are continuous bands 610 that should be combined with the current block tensor (another one of 604). The cache manager 558 returns the continuous band 610 stored in the cache 562 that is adjacent to the current block tensor 604. For example, when processing block 5 (604-5) in FIG. 6, the cache manager 558 returns continuous band B 610-2 and C 610-3 from block 2 604-2, continuous band A 610-1 and C 610-3 from block 4 604-4, and continuous band C 610-3 from block 1 604-1. The returned continuous band 610 is combined to the current block tensor 604 and convolution is applied to the new tensor 604.

After the convolution is finished, the corresponding caching counters 560 of those used continuous bands 610 are decreased by one. If a caching counter 560 reaches 0, the corresponding continuous band 610 is removed from the cache 562.

If a continuation band size (606/608) is a negative number, no data is stored in the cache 562. Instead of combining the continuous band 610 with the block tensor 604, the corresponding part in the block tensor 604 is removed before applying the convolution operation.

If paddings are specified for a convolution operation, the input tensor 512 is first padded and then divided into blocks 604. No padding is applied when the system processes each block tensor 604.

In another embodiment, the padding is applied to the block tensor 604 depending on the position of the block 604 in the input tensor 512 by the convolution operator. For example, the padding is applied to the top and left side of block 1 604-1, and no padding shall be applied to block 5 604-5.

An Example of the Caching and Clearing Mechanism

Table 1 shows the memory management and cache status when an input tensor 512 is processed using the proposed caching and clearing mechanism. The input tensor 512 is divided into 9 blocks 604 as shown in FIG. 6. In Table 1, "1A" stands for continuous band A 610-1 of block 1 604-1, "1B" stands for continuous band B 610-2 of block 1, etc.

TABLE 1

| Action | Caching counter values after the action | Continuous bands in cache after the action |
|---|---|---|
| Load block 1 | 1A = 1, 1B = 1, 1C = 3 | 1A, 1B, 1C |
| Process block 1 and update counters | 1A = 1, 1B = 1, 1C = 3, | 1A, 1B, 1C |
| Load block 2 | 1A = 1, 1B = 1, 1C = 3<br>2A = 1, 2B = 1, 2C = 3 | 1A, 1B, 1C<br>2A, 2B, 2C |
| Process block 2 (with 1A, 1C) and update counters | 1A = 0, 1B = 1, 1C = 2<br>2A = 1, 2B = 1, 2C = 3 | 1A, 1B, 1C<br>2A, 2B, 2C |
| Free cache: 1A | 1B = 1, 1C = 2<br>2A = 1, 2B = 1, 2C = 3 | 1B, 1C<br>2A, 2B, 2C |
| Load block 3 | 1B = 1, 1C = 2<br>2A = 1, 2B = 1, 2C = 3<br>3B = 1, 3C = 2 | 1B, 1C<br>2A, 2B, 2C<br>3B, 3C |
| Process block 3 (with 2A, 2C) and update counters | 1B = 1, 1C = 2<br>2A = 0, 2B = 1, 2C = 2<br>3B = 1, 3C = 1 | 1B, 1C<br>2A, 2B, 2C<br>3B, 3C |
| Free cache: 2A | 1B = 1, 1C = 2<br>2B = 1, 2C = 2<br>3B = 1, 3C = 1 | 1B, 1C<br>2B, 2C<br>3B, 3C |
| ... | | |

Experiment Results

This section demonstrates the effectiveness of the described method. A neural network 514 with three convolutional layers was used to process an image 512 of size 7068×4320. The system 510 was tested on a computer 50 with a GPU 550 with 8 GB memory 552. The three convolution layers are with the following parameters: Layer 1: kernel=7, stride=1, input channel=3, output channel=64; Layer 2: kernel=7, stride=1, input channel=64, output channel=128; Layer 3: kernel=3, stride=1, input channel=128, output channel=128.

The input tensor 512 cannot be processed directly by the GPU 550 because of the memory 552 limitation. The input tensor 512 is partitioned into blocks 604 of size 512×512. It can be calculated that the receptive field size of this convolutional neural network 514 is 15. Table 2 shows data transfer from main memory 58 to GPU memory 552 of the described method compared to the method used in reference [$L^2C$].

TABLE 2

| method used in [$L^2C$] | method described herein | Memory transferring saving |
|---|---|---|
| 399.3 MB | 380 MB | −4.8% |

Figure 11:
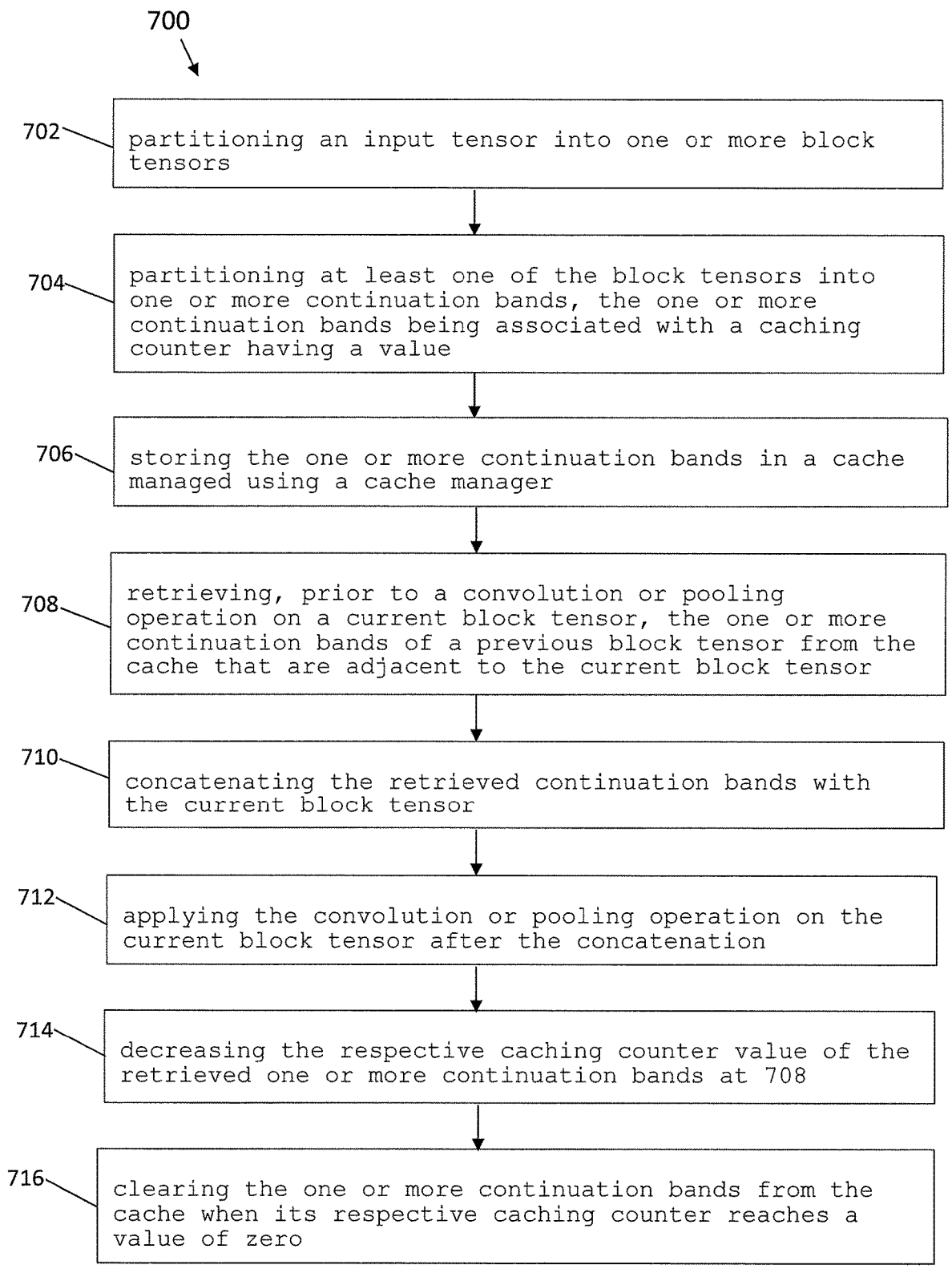
FIG. 11 is an example method to implement a caching and clearing mechanism for deep convolutional neural networks, based on the examples described herein.

FIG. 11 is an example method 700 to implement a caching and clearing mechanism for deep convolutional neural networks, based on the examples described herein. At 702, the method includes partitioning an input tensor into one or more block tensors. At 704, the method includes partitioning at least one of the block tensors into one or more continuation bands, the one or more continuation bands being associated with a caching counter having a value. At 706, the method includes storing the one or more continuation bands in a cache managed using a cache manager. At 708, the method includes retrieving, prior to a convolution or pooling operation on a current block tensor, the one or more continuation bands of a previous block tensor from the cache that are adjacent to a current block tensor. At 710, the method includes concatenating the retrieved continuation bands with the current block tensor. At 712, the method includes applying the convolution or pooling operation on the current block tensor after the concatenation. At 714, the method includes decreasing the respective caching counter value of the retrieved one or more continuation bands. At 716, the method includes clearing the one or more continuation bands from the cache when its respective caching counter reaches a value of zero.

References to a 'computer', 'processor', etc. should be understood to encompass computers having different architectures such as single/multi-processor architectures and sequential (Von Neumann)/parallel architectures, as well as specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, fixed memory and removable memory. The memory(ies) may comprise a database for storing data. The memory(ies) as described herein may be non-transitory, transitory, volatile, or non-volatile.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one memory including computer program code; wherein the at least one memory and the computer program code are configured to, with the at least one processor, cause the apparatus at least to perform: partition an input tensor into one or more block tensors; partition at least one of the block tensors into one or more continuation bands, the one or more continuation bands being associated with a caching counter having a value; store the one or more continuation bands in a cache managed using a cache manager; retrieve, prior to a convolution or pooling operation on a current block tensor, the one or more continuation bands of a previous block tensor from the cache that are adjacent to a current block tensor; concatenate the retrieved continuation bands with the current block tensor; apply the convolution or pooling operation on the current block tensor after the concatenation; decrease the respective caching counter value of the retrieved one or more continuation bands; and clear the one or more continuation bands from the cache when its respective caching counter reaches a value of zero.

Other aspects of the apparatus may include the following. The at least one memory and the computer program code may be further configured to, with the at least one processor, cause the apparatus at least to perform: determine an initial value of the one or more caching counters based on a type of continuation band associated with the caching counter and a position of the block tensor associated with the continuation band. The at least one memory and the computer program code may be further configured to, with the at least one processor, cause the apparatus at least to perform: determine a size of the block tensors using the memory. The at least one memory and the computer program code may be further configured to, with the at least one processor, cause the apparatus at least to perform: process the block tensors in raster scan order. The memory may be a memory of a graphics processing unit or a tensor processing unit. Storing the one or more continuation bands in the cache may comprise transferring the one or more continuation bands from a main memory to the memory of the graphics processing unit or the tensor processing unit using the cache manager. A size of the one or more continuation bands may be determined based at least on a position width and a position height, and the position width is either positive or negative, and the position height is either positive or negative. The position width may be a function of a width of an associated block tensor and a stride value of a convolution kernel, and the position height may be a function of a height of the associated block tensor and the stride value of the convolution kernel. When the size of a continuation band is negative, a corresponding part of the current block tensor may be removed prior to applying the convolution operation, instead of concatenating the retrieved one or more continuation bands with the current block tensor. The one or more continuation bands may be one of three types, where a first type comprises a right side region of a block tensor, a second type comprises a bottom side region of the block tensor, and a third type comprises an overlapping area of the first region and the second region. The at least one memory and the computer program code may be further configured to, with the at least one processor, cause the apparatus at least to perform: pad the input tensor prior to partitioning the input tensor into one or more block tensors. The at least one memory and the computer program code may be further configured to, with the at least one processor, cause the apparatus at least to perform: apply padding to a block tensor depending at least on a position of the block tensor in the input tensor when the block tensor is processed during the convolution operation. The convolution or pooling operation may be a neural network operation.

An example apparatus includes means for partitioning an input tensor into one or more block tensors; means for partitioning at least one of the block tensors into one or more continuation bands, the one or more continuation bands being associated with a caching counter having a value; means for storing the one or more continuation bands in a cache managed using a cache manager; means for retrieving, prior to a convolution or pooling operation on a current block tensor, the one or more continuation bands of a previous block tensor from the cache that are adjacent to a current block tensor; means for concatenating the retrieved continuation bands with the current block tensor; means for applying the convolution or pooling operation on the current block tensor after the concatenation; means for decreasing the respective caching counter value of the retrieved one or more continuation bands; and means for clearing the one or more continuation bands from the cache when its respective caching counter reaches a value of zero.

Other aspects of the apparatus may include the following. The apparatus may further include means for determining an initial value of the one or more caching counters based on a type of continuation band associated with the caching counter and a position of the block tensor associated with the continuation band. The apparatus may further include means for determining a size of the block tensors using a memory. The apparatus may further include means for processing the block tensors in raster scan order. The memory may be a memory of a graphics processing unit or a tensor processing unit. Storing the one or more continuation bands in the cache may include transferring the one or more continuation bands from a main memory to the memory of the graphics processing unit or the tensor processing unit using the cache manager. A size of the one or more continuation bands may be determined based at least on a position width and a position height, and the position width is either positive or negative, and the position height is either positive or negative. The position width may be a function of a width of an associated block tensor and a stride value of a convolution kernel, and the position height may be a function of a height of the associated block tensor and the stride value of the convolution kernel. When the size of a continuation band is negative, a corresponding part of the current block tensor may be removed prior to applying the convolution operation, instead of concatenating the retrieved one or more continuation bands with the current block tensor. The one or more continuation bands may be one of three types, where a first type comprises a right side region of a block tensor, a second type comprises a bottom side region of the block tensor, and a third type comprises an overlapping area of the first region and the second region. The apparatus may further include means for padding the input tensor prior to partitioning the input tensor into one or more block tensors. The apparatus may further include means for applying padding to a block tensor depending at least on a position of the block tensor in the input tensor when the block tensor is processed during the convolution operation. The convolution or pooling operation may be a neural network operation.

An example method includes partitioning an input tensor into one or more block tensors; partitioning at least one of the block tensors into one or more continuation bands, the one or more continuation bands being associated with a caching counter having a value; storing the one or more continuation bands in a cache managed using a cache manager; retrieving, prior to a convolution or pooling operation on a current block tensor, the one or more continuation bands of a previous block tensor from the cache that are adjacent to a current block tensor; concatenating the retrieved continuation bands with the current block tensor; applying the convolution or pooling operation on the current block tensor after the concatenation; decreasing the respective caching counter value of the retrieved one or more continuation bands; and clearing the one or more continuation bands from the cache when its respective caching counter reaches a value of zero.

Other aspects of the method may include the following. The method may further include determining an initial value of the one or more caching counters based on a type of continuation band associated with the caching counter and a position of the block tensor associated with the continuation band. The method may further include determining a size of the block tensors using a memory. The method may further include processing the block tensors in raster scan order. The memory may be a memory of a graphics processing unit or a tensor processing unit. Storing the one or more continuation bands in the cache may including transferring the one or more continuation bands from a main memory to the memory of the graphics processing unit or the tensor processing unit using the cache manager. The size of the one or more continuation bands may be determined based at least on a position width and a position height, and the position width is either positive or negative, and the position height is either positive or negative. The position width may be a function of a width of an associated block tensor and a stride value of a convolution kernel, and the position height may be a function of a height of the associated block tensor and the stride value of the convolution kernel. When the size of a continuation band is negative, a corresponding part of the current block tensor may be removed prior to applying the convolution operation, instead of concatenating the retrieved one or more continuation bands with the current block tensor. The one or more continuation bands may be one of three types, where a first type comprises a right side region of a block tensor, a second type comprises a bottom side region of the block tensor, and a third type comprises an overlapping area of the first region and the second region. The method may further include padding the input tensor prior to partitioning the input tensor into one or more block tensors. The method may further include applying padding to a block tensor depending at least on a position of the block tensor in the input tensor when the block tensor is processed during the convolution operation. The convolution or pooling operation may be a neural network operation.

An example non-transitory program storage device readable by a machine, tangibly embodying a program of instructions executable by the machine for performing operations may be provided, the operations comprising: partitioning an input tensor into one or more block tensors; partitioning at least one of the block tensors into one or more continuation bands, the one or more continuation bands being associated with a caching counter having a value; storing the one or more continuation bands in a cache managed using a cache manager; retrieving, prior to a convolution or pooling operation on a current block tensor, the one or more continuation bands of a previous block tensor from the cache that are adjacent to a current block tensor; concatenating the retrieved continuation bands with the current block tensor; applying the convolution or pooling operation on the current block tensor after the concatenation; decreasing the respective caching counter value of the retrieved one or more continuation bands; and clearing the one or more continuation bands from the cache when its respective caching counter reaches a value of zero.

Other aspects of the non-transitory program storage device may include the following. The operations of the non-transitory program storage device may further include determining an initial value of the one or more caching counters based on a type of continuation band associated with the caching counter and a position of the block tensor associated with the continuation band. The operations of the non-transitory program storage device may further include determining a size of the block tensors using a memory. The operations of the non-transitory program storage device may further include processing the block tensors in raster scan order. The memory may be a memory of a graphics processing unit or a tensor processing unit. Storing the one or more continuation bands in the cache may include transferring the one or more continuation bands from a main memory to the memory of the graphics processing unit or the tensor processing unit using the cache manager. A size of the one or more continuation bands may be determined based at least on a position width and a position height, and the position width is either positive or negative, and the position height is either positive or negative. The position width may be a function of a width of an associated block tensor and a stride value of a convolution kernel, and the position height may be a function of a height of the associated block tensor and the stride value of the convolution kernel. When the size of a continuation band is negative, a corresponding part of the current block tensor may be removed prior to applying the convolution operation, instead of concatenating the retrieved one or more continuation bands with the current block tensor. The one or more continuation bands may be one of three types, where a first type comprises a right side region of a block tensor, a second type comprises a bottom side region of the block tensor, and a third type comprises an overlapping area of the first region and the second region. The operations of the non-transitory program storage device may further include padding the input tensor prior to partitioning the input tensor into one or more block tensors. The operations of the non-transitory program storage device may further include applying padding to a block tensor depending at least on a position of the block tensor in the input tensor when the block tensor is processed during the convolution operation. The convolution or pooling operation may be a neural network operation.

An example method includes partitioning an input tensor into one or more non-overlapping block tensors; partitioning at least one of the block tensors into one or more continuation bands, the one or more continuation bands being associated with a caching counter having a value; storing the one or more continuation bands in a cache managed using a cache manager; retrieving, prior to a convolution or pooling operation on a current block tensor, the one or more continuation bands of a previous block tensor from the cache that are adjacent to a current block tensor; concatenating the retrieved continuation bands with the current block tensor; applying the convolution or pooling operation on the current block tensor after the concatenation; decreasing the respective caching counter value of the retrieved one or more continuation bands; and clearing the one or more continuation bands from the cache when its respective caching counter reaches a value of zero. The method may further include padding the input tensor prior to partitioning the input tensor into one or more non-overlapping block tensors.

It should be understood that the foregoing description is merely illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

1D, 2D, 3D one-dimensional, two-dimensional, three-dimensional

3GPP 3rd Generation Partnership Project 4G fourth generation of broadband cellular network technology 5G fifth generation cellular network technology 802.x family of IEEE standards dealing with local area networks and metropolitan area networks ASIC application-specific integrated circuit CDMA code-division multiple access
CPU central processing unit
DCT discrete cosine transform
DSP digital signal processor
ECSEL Electronic Components and Systems for European Leadership
FDMA frequency division multiple access
FPGA field-programmable gate array
GPU graphics processing unit
GSM Global System for Mobile Communications
H height
H.222.0 MPEG-2 Systems, standard for the generic coding of moving pictures and associated audio information
H.26x family of video coding standards in the domain of the ITU-T
HMD head mounted display
http hypertext transfer protocol
IBC intra block copy
IEC International Electrotechnical Commission
IEEE Institute of Electrical and Electronics Engineers
I/F interface
IMD integrated messaging device
IMS instant messaging service
I/O input output
IoT internet of things
IP internet protocol
ISO International Organization for Standardization
ISOBMFF ISO base media file format
ITU International Telecommunication Union
ITU-T ITU Telecommunication Standardization Sector
JU joint undertaking
L²C learning to learn to compress
LTE long-term evolution
MMS multimedia messaging service
MPEG-2 moving picture experts group H.222/H.262 as defined by the ITU
MSE mean squared error
NAL network abstraction layer
NN neural network(s)
NW network
PC personal computer
PDA personal digital assistant
PH continuation band size in height direction
PID packet identifier
PLC power line connection
PSNR peak signal-to-noise ratio
PW continuation band size in width direction
ReLU rectified linear unit
RFID radio frequency identification
RFM reference frame memory
RGB red, green, blue
SMS short messaging service
SSIM structural similarity index measure
TCP-IP transmission control protocol-internet protocol
TDMA time-division multiple access
TPU tensor processing unit
TS transport stream
TV television
UICC universal integrated circuit card
UMTS Universal Mobile Telecommunications System
USB universal serial bus
W width
WLAN wireless local area network

What is claimed is:

1. An apparatus comprising:
at least one processor; and
at least one non-transitory memory including computer program code;
wherein the at least one memory and the computer program code are configured to, with the at least one processor, cause the apparatus at least to perform:
partition an input tensor into one or more block tensors;
partition at least one of the block tensors into one or more continuation bands, the one or more continuation bands being associated with a caching counter having a value;
store the one or more continuation bands in a cache managed using a cache manager;
retrieve, prior to a convolution or pooling operation on a current block tensor, the one or more continuation bands of a previous block tensor from the cache that are adjacent to a current block tensor;
concatenate the retrieved continuation bands with the current block tensor;
apply the convolution or pooling operation on the current block tensor after the concatenation;
decrease the respective caching counter value of the retrieved one or more continuation bands; and
clear the one or more continuation bands from the cache when its respective caching counter reaches a value of zero.

2. The apparatus of claim 1, wherein the at least one memory and the computer program code are further configured to, with the at least one processor, cause the apparatus at least to perform:
determine an initial value of the one or more caching counters based on a type of continuation band associated with the caching counter and a position of the block tensor associated with the continuation band.

3. The apparatus of claim 1, wherein the at least one memory and the computer program code are further configured to, with the at least one processor, cause the apparatus at least to perform:
determine a size of the block tensors using the memory.

4. The apparatus of claim 1, wherein the at least one memory and the computer program code are further configured to, with the at least one processor, cause the apparatus at least to perform:
process the block tensors in raster scan order.

5. The apparatus of claim 1, where the memory is a memory of a graphics processing unit or a tensor processing unit.

6. The apparatus of claim 5, where storing the one or more continuation bands in the cache comprises transferring the one or more continuation bands from a main memory to the memory of the graphics processing unit or the tensor processing unit using the cache manager.

7. The apparatus of claim 1, where a size of the one or more continuation bands is determined based at least on a position width and a position height, and the position width is either positive or negative, and the position height is either positive or negative.

8. The apparatus of claim 7, where the position width is a function of a width of an associated block tensor and a stride value of a convolution kernel, and the position height is a function of a height of the associated block tensor and the stride value of the convolution kernel.

9. The apparatus of claim 7, where when the size of a continuation band is negative, a corresponding part of the current block tensor is removed prior to applying the convolution operation, instead of concatenating the retrieved one or more continuation bands with the current block tensor.

10. The apparatus of claim 1, where the one or more continuation bands are one of three types, where a first type comprises a right side region of a block tensor, a second type comprises a bottom side region of the block tensor, and a third type comprises an overlapping area of the first region and the second region.

11. The apparatus of claim 1, wherein the at least one memory and the computer program code are further configured to, with the at least one processor, cause the apparatus at least to perform:
pad the input tensor prior to partitioning the input tensor into one or more block tensors.

12. The apparatus of claim 1, wherein the at least one memory and the computer program code are further configured to, with the at least one processor, cause the apparatus at least to perform:
apply padding to a block tensor depending at least on a position of the block tensor in the input tensor when the block tensor is processed during the convolution operation.

13. The apparatus of claim 1, where the convolution or pooling operation is a neural network operation.

14. A method comprising:
partitioning an input tensor into one or more block tensors;
partitioning at least one of the block tensors into one or more continuation bands, the one or more continuation bands being associated with a caching counter having a value;
storing the one or more continuation bands in a cache managed using a cache manager;
retrieving, prior to a convolution or pooling operation on a current block tensor, the one or more continuation bands of a previous block tensor from the cache that are adjacent to a current block tensor;
concatenating the retrieved continuation bands with the current block tensor;
applying the convolution or pooling operation on the current block tensor after the concatenation;
decreasing the respective caching counter value of the retrieved one or more continuation bands; and
clearing the one or more continuation bands from the cache when its respective caching counter reaches a value of zero.

15. The method of claim 14, further comprising:
determining an initial value of the one or more caching counters based on a type of continuation band associated with the caching counter and a position of the block tensor associated with the continuation band.

16. The method of claim 14, further comprising:
determining a size of the block tensors using a memory.

17. The method of claim 14, further comprising:
processing the block tensors in raster scan order.

18. A non-transitory program storage device readable by a machine, tangibly embodying a program of instructions executable by the machine for performing operations, the operations comprising:
partitioning an input tensor into one or more block tensors;
partitioning at least one of the block tensors into one or more continuation bands, the one or more continuation bands being associated with a caching counter having a value;
storing the one or more continuation bands in a cache managed using a cache manager;
retrieving, prior to a convolution or pooling operation on a current block tensor, the one or more continuation bands of a previous block tensor from the cache that are adjacent to a current block tensor;
concatenating the retrieved continuation bands with the current block tensor;
applying the convolution or pooling operation on the current block tensor after the concatenation;
decreasing the respective caching counter value of the retrieved one or more continuation bands; and
clearing the one or more continuation bands from the cache when its respective caching counter reaches a value of zero.

19. The non-transitory program storage device of claim 18, the operations further comprising:
determining an initial value of the one or more caching counters based on a type of continuation band associated with the caching counter and a position of the block tensor associated with the continuation band.

20. The non-transitory program storage device of claim 18, the operations further comprising:
determining a size of the block tensors using a memory.

* * * * *